June 16, 1959 R. J. HAMILL 2,890,759
CLUTCH RELEASING ATTACHMENT FOR TRACTORS
Filed Jan. 17, 1958 2 Sheets-Sheet 1
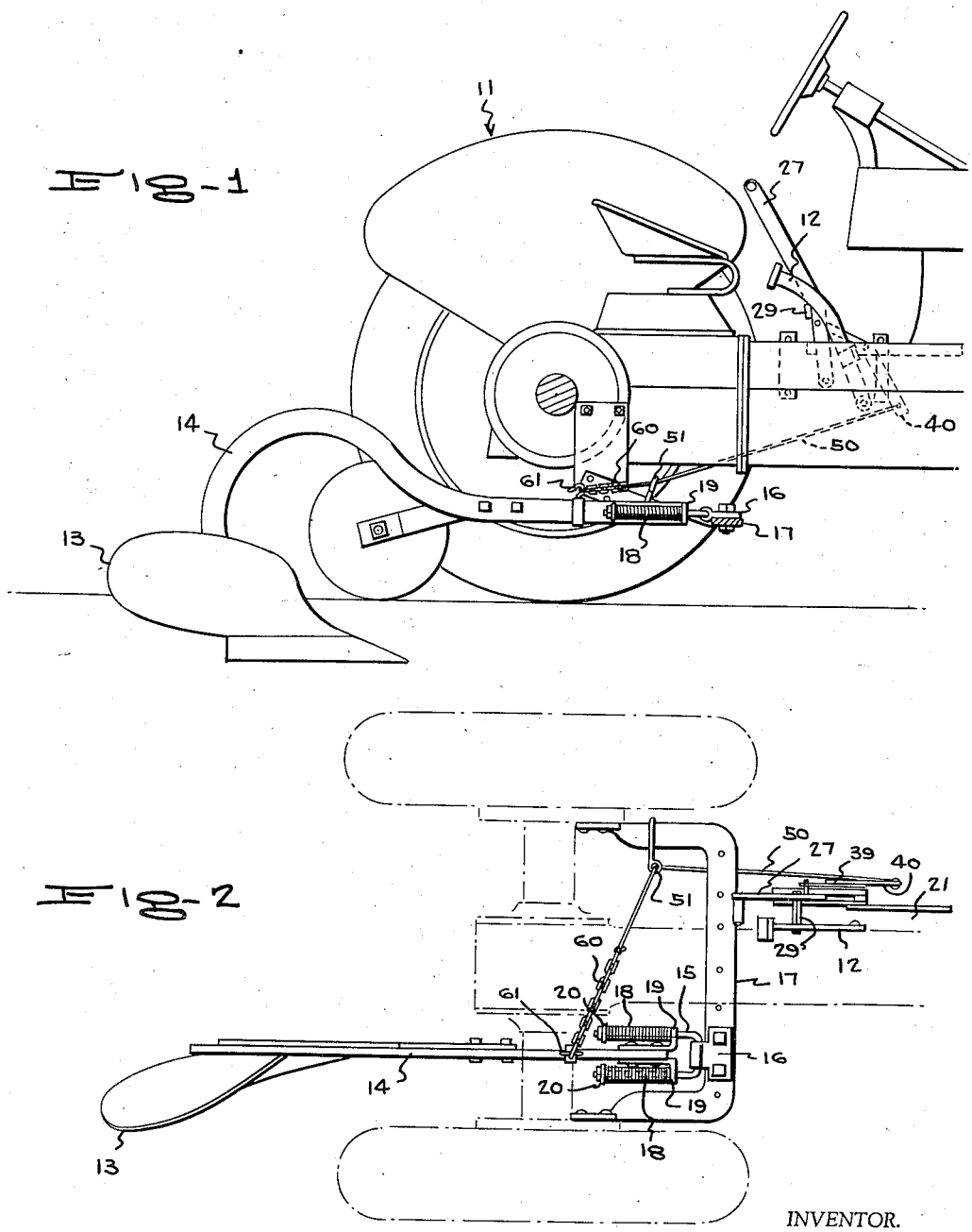
INVENTOR.
ROBERT J. HAMILL
BY
McMorrow, Berman & Davidson
ATTORNEYS

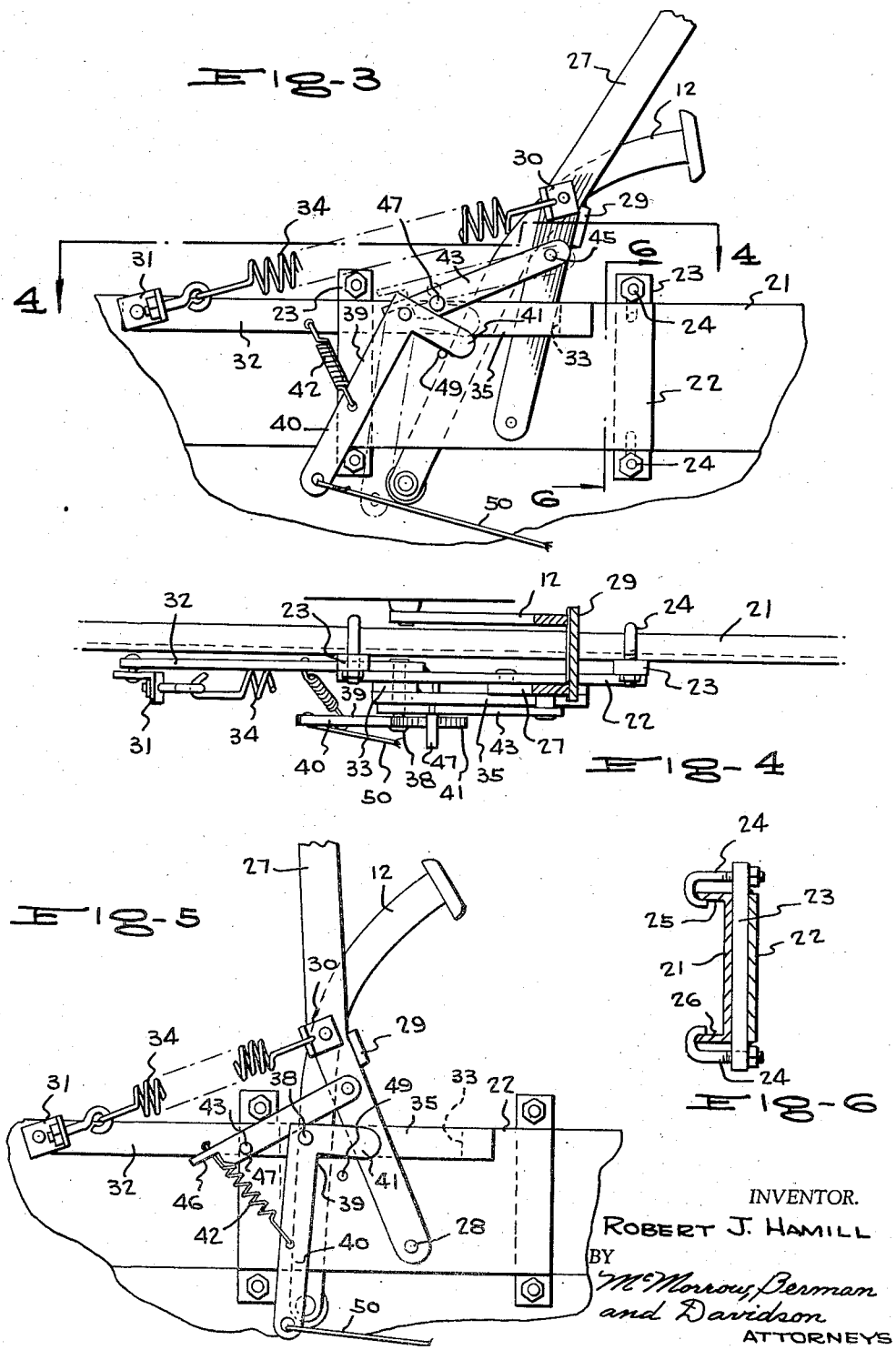

United States Patent Office 2,890,759
Patented June 16, 1959

2,890,759

CLUTCH RELEASING ATTACHMENT FOR TRACTORS

Robert J. Hamill, Muskegon, Mich.

Application January 17, 1958, Serial No. 709,630

2 Claims. (Cl. 180—14.5)

This invention relates to tractor clutch-operating devices, and more particularly to an attachment adapted to be mounted on a tractor and arranged to automatically release the tractor clutch when an implement connected to or driven by the tractor encounters a substantially immovable obstacle, whereby damage to the implement and excessive shock to the tractor will be prevented.

A main object of the invention is to provide a novel and improved automatic tractor clutch-releasing mechanism which is simple in construction, which is easy to install, and which provides a very rapid clutch-releasing action, whereby an implement drawn or driven by the tractor will not be damaged when engaging a substantially immovable obstacle, and whereby excessive impact or shock to the tractor is prevented.

A further object of the invention is to provide an improved automatic clutch-releasing attachment for a tractor employed with a plow or any other implement driven by the tractor, said attachment involving inexpensive components, being durable in construction, being reliable in operation, and enabling a tractor to be employed at a much higher speed than has been hitherto possible, since the tractor will be protected against shock or damage to the implement connected thereto when said implement engages a stone or similar substantially immovable obstacle.

Further objects and advantages of the invention will become apparent from the following description and claims, and from the accompanying drawings wherein:

Figure 1 is a vertical cross sectional view taken through the rear portion of a tractor to which a plow is yieldably connected, the tractor being provided with an improved automatic clutch-releasing attachment according to the present invention.

Figure 2 is a top plan view of the plow shown in Figure 1, showing the connection thereof to the clutch-releasing mechanism, portions of the tractor being shown in dotted view.

Figure 3 is an enlarged side elevational view of the clutch-releasing attachment employed in Figures 1 and 2.

Figure 4 is a horizontal cross sectional view taken substantially on the line 4—4 of Figure 3.

Figure 5 is a side elevational view, similar to Figure 3, but showing the attachment in triggered position, whereby the clutch pedal is moved to clutch-releasing position.

Figure 6 is a cross sectional detail view taken on the line 6—6 of Figure 3.

Referring to the drawings, 11 generally designates a conventional tractor having a clutch pedal 12 and having a ground-engaging implement, for example, a plow 13 yieldably connected thereto. As shown in Figures 1 and 2, the plow beam 14 of the plow 13 is slidably connected to the arms of a U-shaped yoke member 15 whose bight portion is pivotally connected by a bracket 16 to a tool bar 17. The plow beam 14 is movable longitudinally along the arms of the yoke member 15, the movements thereof being cushioned by respective coiled springs 18 mounted on the arms of the yoke member 15 and acting between end abutment flanges 19, 19 on the end of the plow beam 14 and washers 20, 20 on the ends of the arms of the yoke member 15, whereby the plow beam 14 is biased forwardly of the springs 18 but may yield relative to the tool bar 17 when encountering a stone or similar substantially immovable obstacle.

The tractor 11 includes a longitudinally extending channel-shaped frame bar 21 located adjacent the clutch pedal 12. Designated at 22 is a longitudinally extending, vertical plate member which has respective vertical bar members 23, 23 secured to its end portions and projecting above and below the top edges of the plate member. Respective pairs of hook bolts 24, 24 extend through the top and bottom end portions of the bar members 23 and engage around the top and bottom flanges 25 and 26 of the channel-shaped frame bar 21, as shown in Figure 6, whereby the plate member 22 is securely clamped in parallel spaced relationship to the frame bar 21, the plate member 22 being spaced from the frame bar 21 by the vertical end bar members 23, 23. Designated at 27 is a lever pivoted to the plate member 22 at 28, said lever extending upwardly and being located laterally adjacent to the clutch pedal 12. Rigidly secured to the intermediate portion of the lever 27 is a laterally extending bar member 29 which is engageable with the rear edge of the clutch pedal 12 when the lever is rotated in a counterclockwise direction, as viewed in Figures 3 and 5. Thus, when the lever 27 is rotated from the position shown in Figure 3 to the position shown in Figure 5, the bar member 29 engages the rear edges of the clutch pedal 12 and moves the clutch pedal to clutch-releasing position, shown in Figure 5.

The intermediate portion of the lever member 27 has secured thereto an angle bracket 30, and a coiled spring 34 connects the angle bracket 30 to a similar angle bracket 31 fastened to the end of a bar member 32 rigidly secured in spaced parallel relationship to the frame channel bar 21. Thus, the bar member 32 projects a substantial distance forwardly from the lever member 27. The coiled spring 34 acts to bias the lever member 27 in a counterclockwise direction, as viewed in Figures 3 and 5. The angle brackets 30 and 31 are pivotally connected respectively to the lever member 27 and the bar member 32, whereby the angle brackets may pivot freely as the lever 27 is rotated.

A guide bar 35 is secured in spaced parallel relationship to the plate member 22 outwardly adjacent to the lever 27, spacer blocks 33, 33 being provided between the end portions of the guide bar 35 and the plate member 22 to serve as stop means limiting rotation of the lever 27.

A transverse pivot pin 38 is rigidly secured in the forward upper corner portion of the plate member 22, said pivot pin extending through the bar 32, the plate member 22, one of the guide blocks 33 and the guide bar 35. Designated at 39 is a bell crank lever which is pivoted at its corner portion to the outer portion of the pivot pin 38, said bell crank lever 39 being provided with a depending arm 40 and with the rearwardly extending top arm 41. Bell crank lever 39 is biased clockwise, as viewed in Figure 3, by a relatively light coiled spring 42 connecting the intermediate portion of the arm 40 with the forwardly extending bar member 32, as shown in Figure 3.

Designated at 43 is a latch bar which is pivoted to the lower portion of the lever 27 at 45, said latch bar being formed at its free end with a notch 46 which is engageable on the pivot pin 38 to hold the lever 27 against counterclockwise rotation, as viewed in Figure 3, under the force of the coiled spring 34. Rigidly connected to the latch bar 43 is a horizontally and outwardly projecting pin 47 which overlies the top arm 41 of the bell crank lever 39.

Clockwise rotation of the bell crank lever 39 is limited by a horizontally outwardly extending stop pin 49 rigidly secured to the plate member 22 and extending beneath the arm 41, as shown in Figure 3.

Designated at 50 is a flexible cable connected at one end to the lower end of the bell crank arm 40. Cable 50 extends slidably through an eye bracket 51 and is fastened to the end link of a short chain 60, which in turn is engaged with an anchoring hook 61 mounted on plow beam 14, whereby the preliminary tension in cable 50 may be adjusted by engaging different links of chain 60 with anchoring hook 61. With chain 60 connected to hook 61 so as to provide a suitable preliminary tension in cable 50, in accordance with the yieldability of the ground which is being worked, an abnormal increase in the tension exerted on the cable 50 causes the bell crank lever 39 to be rotated counterclockwise, as viewed in Figure 3, whereby the top arm 41 of the bell crank lever engages the pin member 47 and lifts the latching lever 43, thus releasing the main lever 27.

The device may be cocked, namely, placed in a position thereof illustrated in Figure 3 by manually rotating the lever 27 clockwise until the latching lever 43 moves to a position wherein the notch 46 in the end thereof engages on the pin 38. This holds the lever 27 against counterclockwise rotation, the parts being in the positions illustrated in Figure 3, wherein the bell crank lever 39 is rotated substantially to the limit of its clockwise movement. When the plow, or other implement attached to the tractor, strikes a stone or similar relatively immovable obstacle, the implement yields because of its resilient connection to the tool bar 17, exerting tension on the cable 50 which is transmitted to the bell crank lever 39. The bell crank lever 39 is thus rotated counterclockwise, as viewed in Figure 3, whereby the upper arm 41 thereof engages the pin 47 and lifts the latch lever 43 to a position wherein the notch 46 disengages from the pin 38, releasing the lever 27. The spring 34 rotates the lever 27 counterlockwise, as viewed in Figure 3, causing the bar 29 to engage against the rear edge of the clutch pedal 12, moving the pedal 12 to clutch-releasing position. The spring 34 is of relatively heavy construction, whereby the above action takes place quite rapidly, providing an almost instantaneous clutch-disengaging action when the plow 13 or other implement strikes the relatively immovable object. This substantially eliminates the risk of damaging the plow or other implement, and also greatly reduces the amount of shock or impact experienced by the tractor when the implement connected thereto strikes a relatively immovable obstacle.

After tripping, the clutch may be reengaged as required in order to move the implement sufficiently to work it clear of the obstacle, by manually moving lever 27 clockwise from its position of Figure 5 a sufficient amount for such reengagement. After the implement has been worked free of the obstacle, the device may be readily reset by rotating the main lever 27 clockwise from the position of Figure 5 until the notched portion 46 of latch lever 43 engages over the pivot pin 38, whereby the lever 27 will be cocked for continued operation of the tractor and its associated ground-engaging implement. It will be understood that after each tripping action of the device, the tractor will be either moved so that the implement will be free of the stone or other object or that the object will be removed, allowing the tractor to proceed along its intended course. After the obstacle has been removed or the implement has been worked free of the obstacle as above described, the device may be reset for subsequent automatic clutch-releasing action when another obstacle is encountered.

By adjusting the effective tension in cable 50 by engaging anchor hook 61 with a selected link of chain 60, the sensitivity of the tripping apparatus may be adjusted in accordance with the type of soil being plowed. For example, in plowing sandy soil, the draft exerted on yieldable springs 18 of the plow beam is less than the draft exerted when plowing in hard clay, whereby the cable may be substantially shortened (by employing fewer links of chain 60) so that tripping lever 39 is closer to pin 47 and thus will trip more quickly since there is less lost motion. On the other hand, when plowing in hard clay, the effective length of the cable must be increased (by using more links of chain 60) to reduce the sensitivity of the device and to prevent undesired tripping.

As will be readily understood by those skilled in the art, the tripping mechanism of the present invention is not limited to use with foot-operated clutches, but may be easily adapted for use with hand-operated clutches as well. Furthermore, the clutch-releasing mechanism of the present invention is not limited to use only with ground-engaging implements but may be employed in conjunction with any implement driven from the power take-off shaft of the tractor, and wherein an emergency trip cable may be employed to trip the device to disengage the engine clutch in the same manner as cable 50, above described. Thus, a quick pull on the cable by the operator would trip the mechanism in an emergency, immediately disconnecting the implement from the tractor engine.

While a specific embodiment of an improved automatic clutch-releasing attachment for a tractor has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination with a tractor having a clutch pedal and a ground-engaging implement yieldably connected to the tractor, means to move the clutch pedal to clutch-disengaging position when the implement encounters a relatively immovable obstacle comprising a lever pivoted to the tractor laterally adjacent the clutch pedal, a projection on the lever engaging with the pedal, spring means biasing the lever in a direction to move the clutch pedal to clutch-disengaging position, a transverse pivot pin on the tractor, a latch arm pivoted to the lever, said latch arm being formed with a notch in its end lockingly engageable with said pin to hold the lever against the force of said spring means, a bell crank lever pivoted at its corner to the tractor adjacent said latch arm and having a top arm portion engageable therewith to elevate and disengage the latch arm from said abutment means responsive to rotation of the bell crank lever, said bell crank lever having a depending bottom arm portion, and means connecting said bottom arm portion to said implement and being formed and arranged to rotate the bell crank lever in a direction to elevate said top arm portion responsive to the engagement of said implement with a relatively immovable obstacle during movement of the trigger.

2. In combination with a tractor having a clutch pedal and a ground-engaging implement yieldably connected to the tractor, means to move the clutch pedal to clutch-disengaging position when the implement encounters a relatively immovable obstacle comprising a lever pivoted to the tractor laterally adjacent the clutch pedal, a projection on the lever engageable with the pedal, spring means biasing the lever in a direction to move the clutch pedal to clutch-disengaging position, a transverse pivot pin on the tractor, a latch arm pivoted to said lever, said latch arm being formed with a notch in its end lockingly engageable with said transverse pivot pin to hold the lever against the force of said spring means, a bell crank lever pivoted at its corner to said pin, a transverse projection on the free end portion, said latch arm, said bell crank lever having a top arm portion substantially engaging beneath said projection to raise the latch arm and disengage said notch from said pin responsive to rotation of the bell crank lever, said bell crank lever having a depending arm portion, and flexible cable means connecting said depending arm portion to said implement and being formed and arranged to rotate the bell crank lever in a direction to raise the latch arm responsive to the engagement of said implement with a relatively immovable obstacle during movement of the tractor.

References Cited in the file of this patent

UNITED STATES PATENTS

| | | |
|---|---|---|
| 1,765,908 | Drennan | June 24, 1930 |
| 1,936,768 | Morkovski | Nov. 28, 1933 |
| 2,240,657 | Lokken | May 6, 1941 |